July 2, 1940. T. S. BAUMAN 2,206,686
APPARATUS FOR APPLYING DECORATIVE COLOR EFFECTS TO GLASS AND CERAMIC WARE
Filed Aug. 4, 1937 5 Sheets-Sheet 1

Inventor
Thomas S Bauman
By W. D. McDowell Attorney

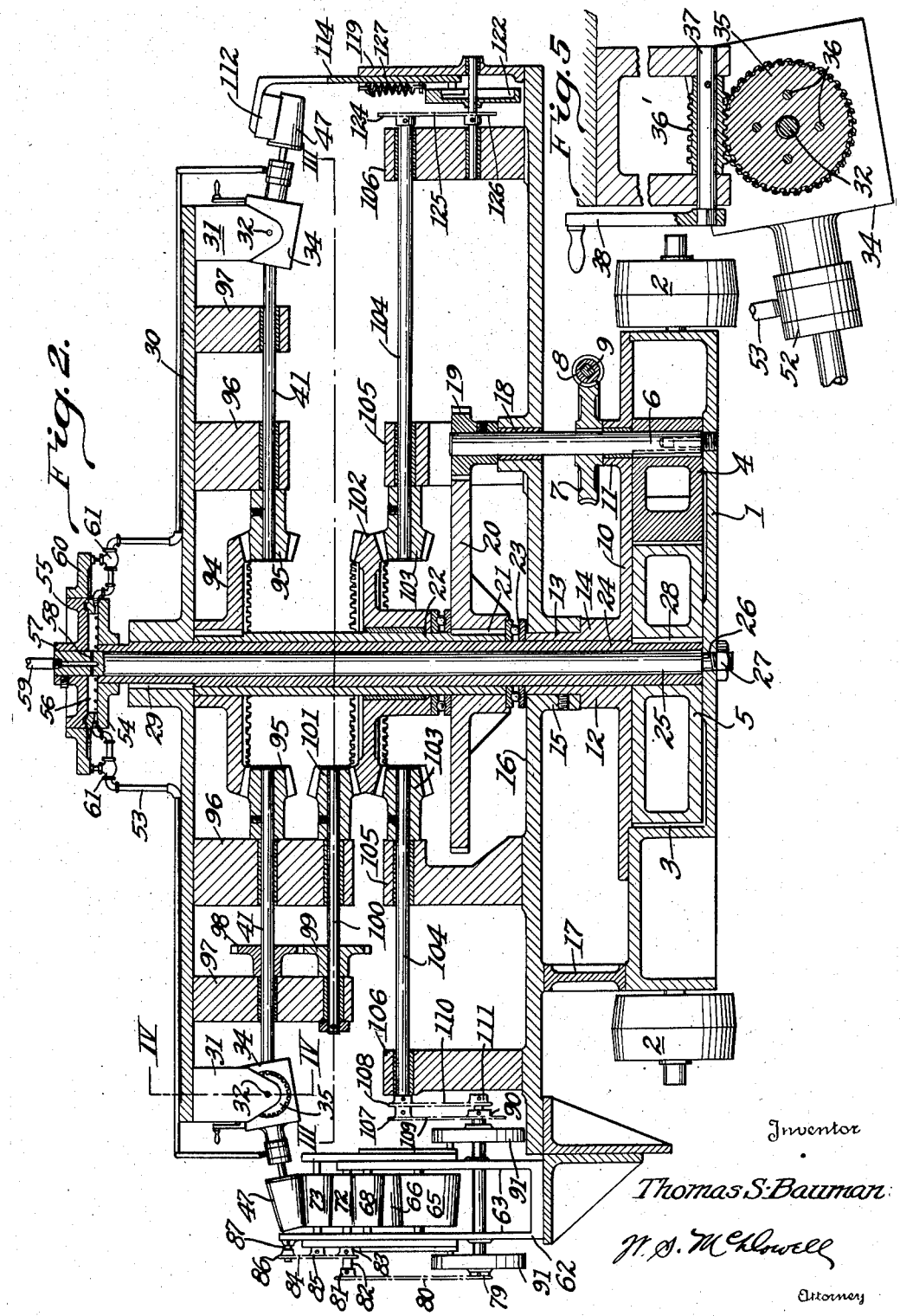

July 2, 1940.  T. S. BAUMAN  2,206,686
APPARATUS FOR APPLYING DECORATIVE COLOR EFFECTS TO GLASS AND CERAMIC WARE
Filed Aug. 4, 1937  5 Sheets-Sheet 3

Inventor
Thomas S. Bauman
By
Attorney

July 2, 1940.  T. S. BAUMAN  2,206,686
APPARATUS FOR APPLYING DECORATIVE COLOR EFFECTS TO GLASS AND CERAMIC WARE
Filed Aug. 4, 1937  5 Sheets-Sheet 4
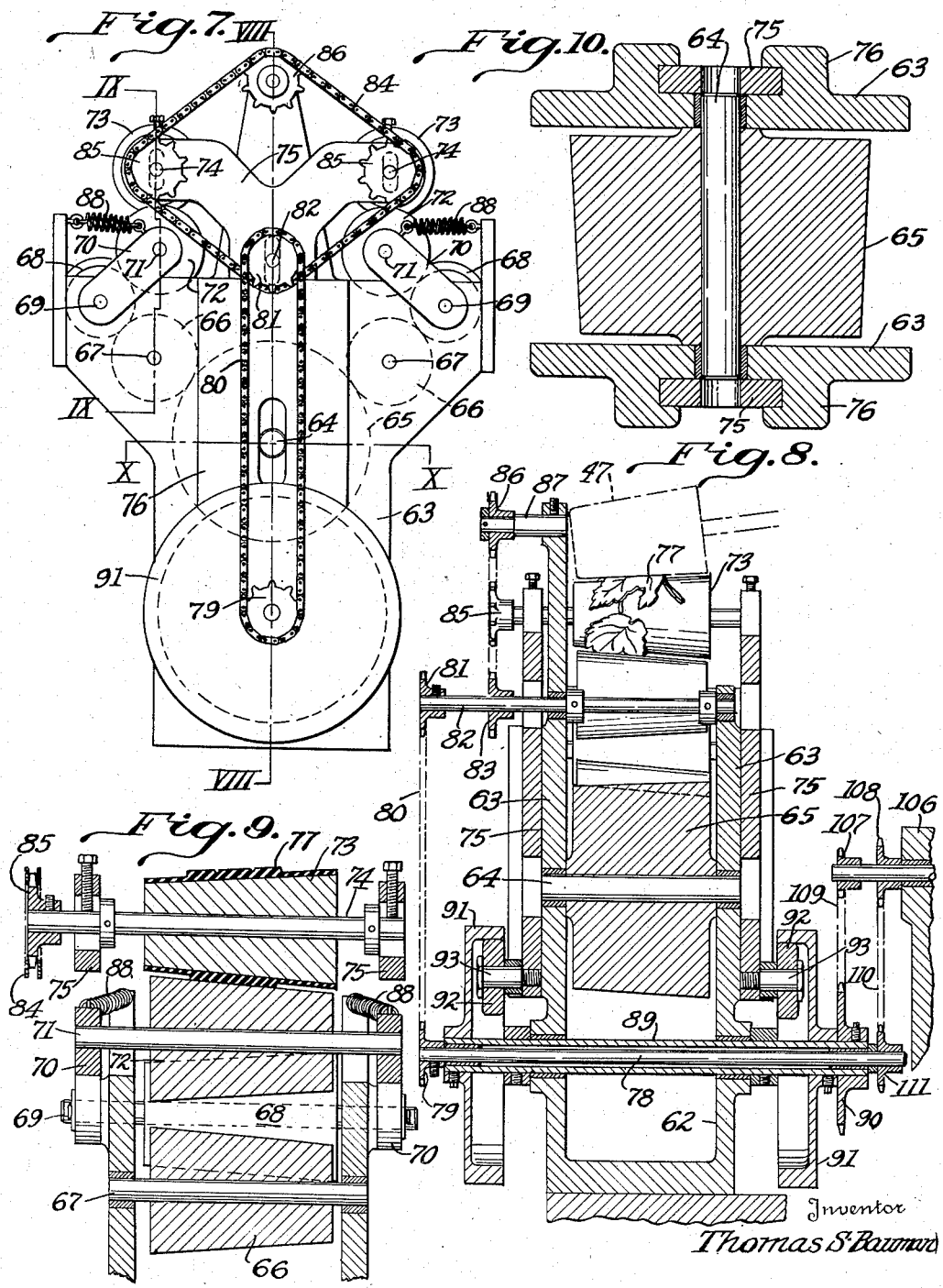

July 2, 1940.   T. S. BAUMAN   2,206,686
APPARATUS FOR APPLYING DECORATIVE COLOR EFFECTS TO GLASS AND CERAMIC WARE
Filed Aug. 4, 1937   5 Sheets-Sheet 5
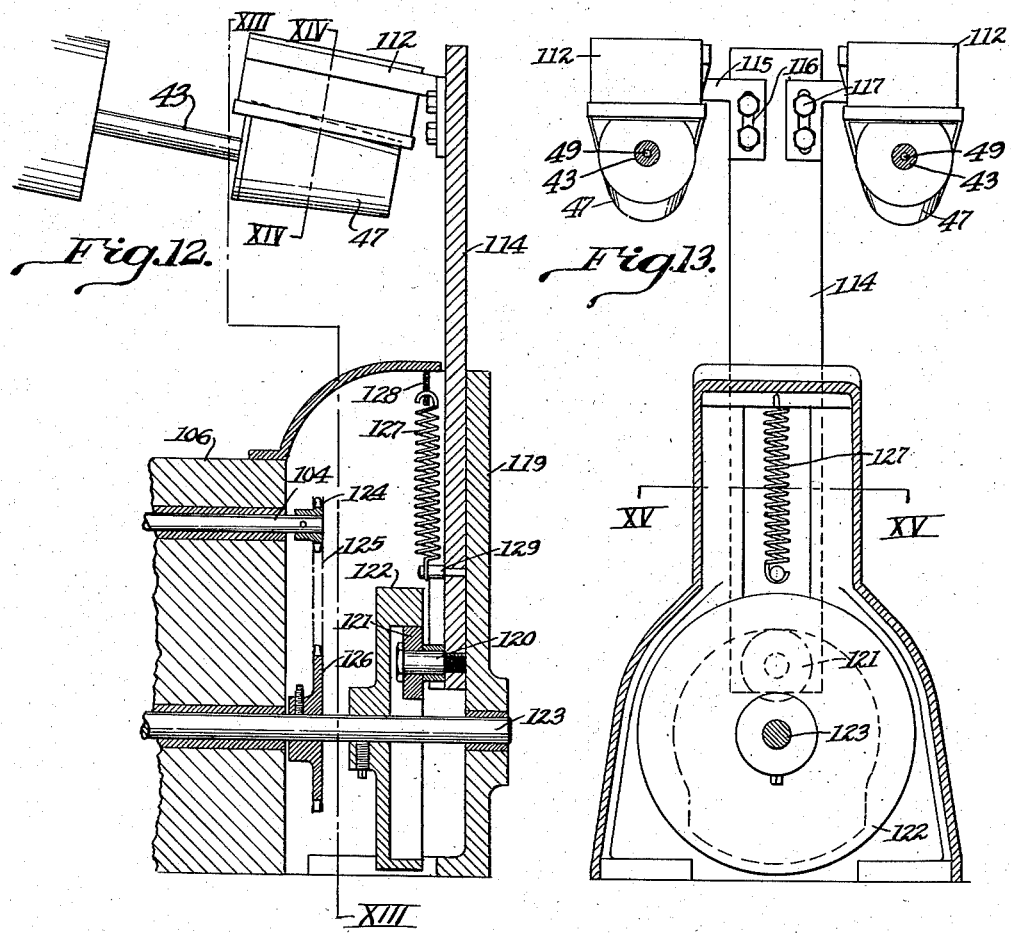
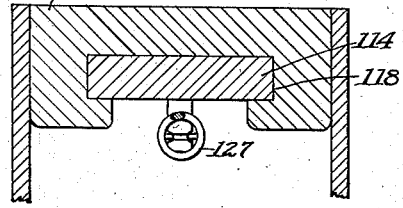
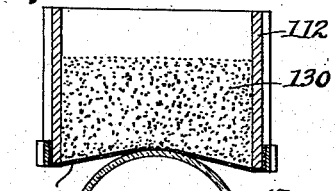
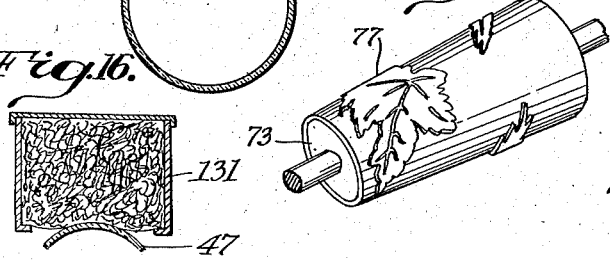
Inventor
Thomas S. Bauman
Attorney Patented July 2, 1940

2,206,686

UNITED STATES PATENT OFFICE 2,206,686

APPARATUS FOR APPLYING DECORATIVE COLOR EFFECTS TO GLASS AND CERAMIC WARE

Thomas S. Bauman, Lancaster, Ohio, assignor to Classic Glass, Inc., Columbus, Ohio, a corporation of Kentucky Application August 4, 1937, Serial No. 157,370

28 Claims. (Cl. 41—1)

This invention relates to the art of applying decorative permanent designs or patterns in single or multiple colors to the surfaces of glass and/or glass-like ware, the primary object of the invention being to provide an improved method and apparatus by which such designs or patterns may be quickly applied in one or more colors to the articles undergoing decoration or embellishment, whereby to obtain pleasing artistic effects with low manufacturing costs, automatic machine operation and rapid output of the finished ware.

The application of fused colored coatings in various patterns or designs to articles of glassware, such as table glasses, milk bottles or the like, from a standpoint of factory production, has been relatively slow and comparatively costly. Also, in the absence of considerable hand work and accompanying high manufacturing costs, methods and appliances now generally used are limited to single color effects.

Accordingly, the present invention provides apparatus for the purpose set forth which, at a high rate of ware output, automatically applies clear well defined designs of any description in one or more colors to articles of glass or ceramic composition, so that the decorative designs or patterns mechanically applied to the surfaces of the glass or ceramic ware will, upon subsequent heat treatment, become permanently fused or bonded to the glass or ceramic surfaces of the articles so treated, producing new ornamental effects and at the same time providing for low manufacturing costs.

For a further understanding of the invention, reference is to be had to the following description and the accompanying drawings, wherein:

Fig. 2 is a vertical longitudinal sectional view taken through the machine on the plane indicated by the line II—II of Fig. 1;

Fig. 5 is a detail sectional view on the line V—V of Fig. 4 and showing the worm and worm gear mechanism for adjusting the angular positions of operation of the article holders;

Fig. 7 is a view in front elevation of the mechanism for driving the impression producing rolls of the machine;

Fig. 8 is a vertical sectional view on the plane indicated by the line VIII—VIII of Fig. 7;

Fig. 9 is a similar view on the line IX—IX of Fig. 7;

Fig. 10 is a horizontal sectional view on the plane indicated by the line X—X of Fig. 7;

Fig. 11 is a detail perspective view of one of the impression producing rolls;

Fig. 12 is a vertical sectional view of the mechanism employed for applying a fusible ceramic color-containing material to the impression receiving surfaces on the articles of glassware or the like handled by the machine forming the present invention;

Fig. 13 is a vertical sectional view on the line XIII—XIII of Fig. 12;

Fig. 14 is a similar view on the line XIV—XIV of Fig. 12 and disclosing more particularly the dye receptacle and the fabric mat at the bottom thereof;

Fig. 15 is a transverse horizontal sectional view on the line XV—XV of Fig. 13.

Fig. 16 is a detail vertical sectional view taken through an element of the machine used to clean the surplus coloring material from the glassware.

Figure 1:
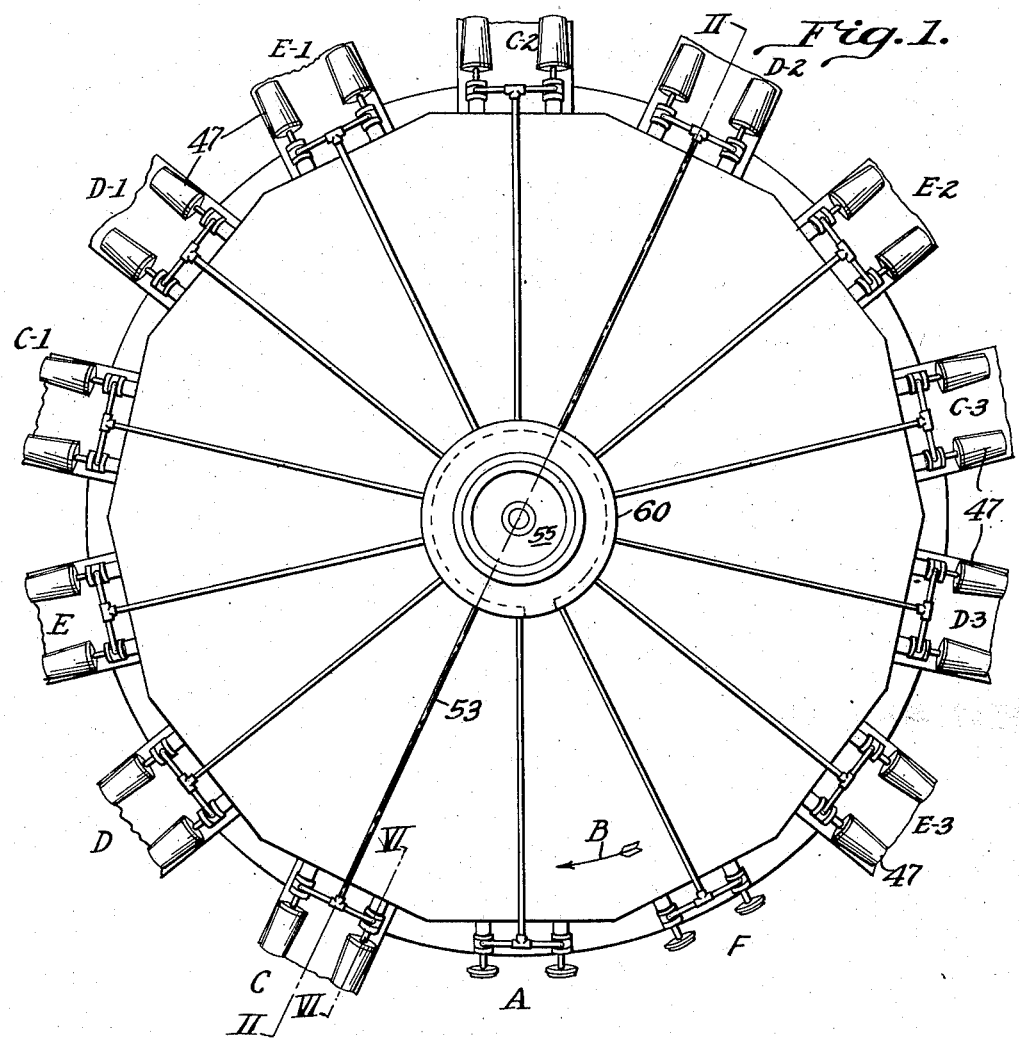
Fig. 1 is a top plan view of a machine employed by the present invention for mechanically applying colored designs to articles of ceramic or glass composition.
Figure 4:
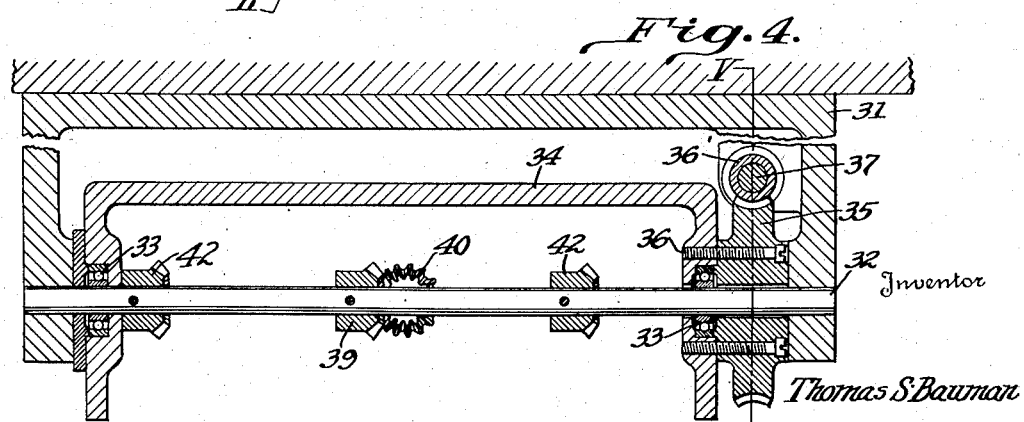
Fig. 4 is a detail vertical section on the line IV—IV of Fig. 2 and disclosing the mechanism for effecting angular adjustments of the article holders.
Figure 3:
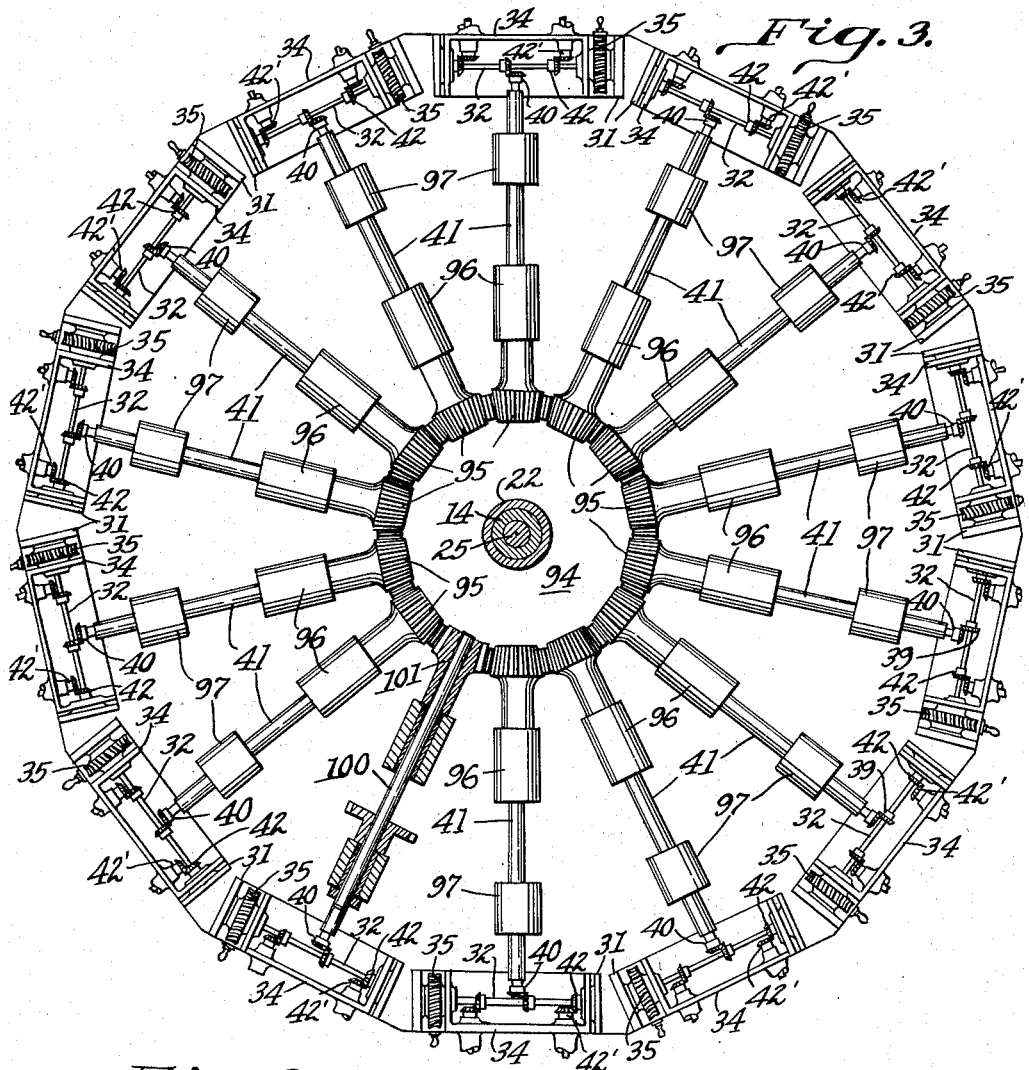
Fig. 3 is a horizontal sectional view taken through the machine on the plane disclosed by the line III—III of Fig. 2 and illustrating the drive mechanism for the article holders.

Referring more particularly to the drawings, there has been illustrated in the several figures thereof, a single preferred mechanism for carrying out the ends of the invention, although it will be understood at this juncture that the mechanism disclosed is illustrative of but one form of the present invention and that the latter may find embodiment and practical expression in many other varying types of mechanism.

In the particular machine illustrated, however, the numeral 1 designates the base casting of the machine which may be stationarily mounted on a suitable foundation or, as shown, may be provided with wheels 2 to provide for limited portability of the machine. The base casting is provided centrally with a chamber 3 in which is mounted for rotation the driving and driven members 4 and 5, respectively, of a Geneva gearing. The driving member 4 is keyed to a vertical shaft 6 to which is also keyed a worm gear 7, the latter meshing with a worm 8 carried by a power driven shaft 9, the latter being driven from any suitable source of power.

A stationary cover plate 10 is arranged over the chamber 3 and is formed with a bearing 11 for the rotatable reception of the shaft 6. Axially of the driven member 5 of the Geneva gearing, the cover plate 10 is provided with an upwardly directed bearing extension 12 having its upper end reduced in thickness, as at 13, and formed with an annular shoulder 14. Stationarily positioned on the extension 12 and resting on the shoulder 14 is a depending collar 15 which integrally depends from a stationary table 16, the table being further supported from the base casting by means of an I-member 17. In alignment with the bearing 11, the table 16 is provided with a vertical bearing 18 for the rotatable reception of the upper end of the shaft 6, and fixed to rotate with the upper end of said shaft, above the bearing 18, is a spur gear 19 which is arranged to mesh with the teeth of an enlarged gear 20.

The hub of the gear 20 is keyed as at 21 to an outer sleeve member 22, the lower end of which and the hub of the gear 20 rest upon a thrust-receiving bearing 23, the latter being carried by the upper end of the bearing extension 13 or by the top of the table 16.

The outer sleeve member 22 rotates about an inner vertically disposed sleeve member 24 which, in turn, rotates about a fixed vertical guide shaft 25 arranged in the vertical axis of the machine, the lower end of the shaft 25 being provided with a reduced threaded extension 26 which extends through an opening formed in the base casting 1 and is threaded for the reception of a securing nut 27. The inner sleeve member 24 is keyed as at 28 to the driven member 5 of the Geneva gear and is therefore positively driven by the rotation of the shaft 9 and intermediate gearing.

At its upper end, the inner sleeve 24 is keyed as at 29 to a rotatable head 30 which is adapted to be intermittently rotated about the vertical axis of the shaft 25 by the action of the Geneva gear, as will be well understood.

Affixed to and depending from the outer peripheral portion of the head 30 are a plurality of circumferentially spaced bifurcated brackets 31. In the lower ends of each of these brackets, there is journaled for rotation a horizontally disposed shaft 32. Loosely mounted on each shaft 32 and supported by means of anti-friction bearings 33 thereon is a yoke 34. The oscillation of the yoke relative to the axis of its supporting shaft 32 is manually effected and maintained by means of a worm gear 35, which is bolted or otherwise secured as at 36 to one of the ends of the yoke, so that the rotation of the gear 35 will effect corresponding movement on the part of the yoke 34 connected therewith. The rotation of the worm gear 35 is effected by the fact that the teeth of each gear 35 mesh with a worm 36' carried by a manually rotated shaft 37 which is journaled in connection with one of the arms of each bracket 31, the outer end of each shaft 37 being equipped with a hand crank 38.

Each shaft 32 is rotated continuously during the operation of the machine by being provided with a beveled gear 39 which meshes with a corresponding gear 40 carried by the outer end of a drive shaft 41, there being such a drive shaft for each of the brackets 31. These drive shafts extend radially from the axis of the shaft 25, and the drive mechanism therefor will be hereinafter described.

Figure 6:
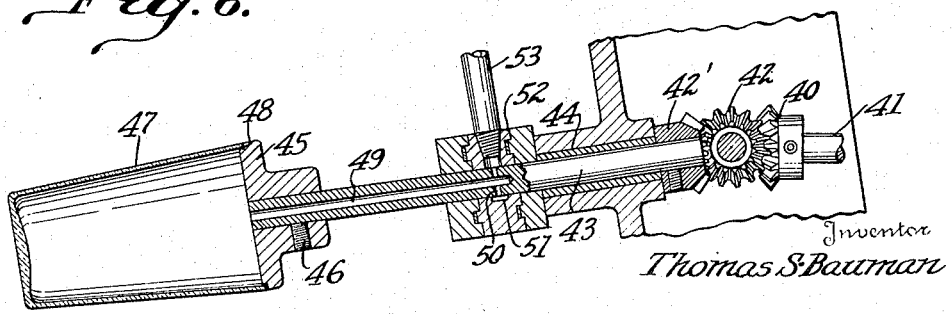
Fig. 6 is a sectional view on the line VI—VI of Fig. 1 and disclosing more particularly the mechanism for holding and rotating articles of glassware or the like employed by the machine.

Also fixed to each of the shafts 32, in spaced relation from the gear 39 is a pair of beveled gears 42 which mesh with similar gears 42' fixed upon the inner ends of a pair of parallel, transversely spaced, forwardly extending shafts 43. These shafts are supported and journaled for rotation in bearings 44 provided in connection with each of the yokes 34 and have their outer ends each equipped with a ware holder 45, each of the latter being detachably connected with its shaft 43 by means of a set screw 46. The holder, disclosed in Fig. 6 of the drawings, is adapted for the reception of an open-ended article such as a drinking glass or tumbler, as indicated at 47, although it will be understood that the holders may be modified to conform with the configuration of an article of glassware or the like to be decorated. In this instance, the holder 45 is provided with an annular seat 48 containing a gasket or washer, and the annular edge of the open end of the article 47 is engaged directly with the seat.

The positive retention of the article 47 on the holder is obtained in this instance by partially evacuating the air within the seated article. This is accomplished by providing a longitudinal bore 49 in the outer end of each of the shafts 43. The inner end of each bore 49 communicates with a plurality of radial transverse passages 50, which communicate with an annular chamber 51 provided in a stationary or non-rotating disk 52. The chamber of each disk 52 is connected with a pipe system 53 supported in connection with the revolving head 30. This pipe system leads to a ring 54, which is fixed to the inner rotating sleeve 24. The upper circumferential edge of the ring 54 is provided with an annular rib receivable within an annular sealing groove provided in a stationary complemental ring 55 which is fixed to the upper end of the shaft 25, a vacuum chamber 56 being formed between adjacent surfaces of the rings 54 and 55, which chamber is in communication with the radiating pipes 53.

The upper end of the shaft 25 is longitudinally bored as at 57 and the lower end of the bore 57 is connected by radiating passages 58 with the chamber 56, the upper end of the bore 57 being joined with a pipe 59 leading to any suitable type of suction or vacuum producing means.

The stationary ring 55 is formed with an outer cam ring 60 which cooperates with a plurality of spring-pressed valves 61 arranged in the inner ends of the pipe lines 53 so that said valves may be automatically opened and closed during the rotation of the head 30 to retain and release the articles 47 on or from the supporting holders 45 therefor. This arrangement provides for the positive retention of the articles of glassware on the holders, the rotation of the articles of glassware axially while the head 30 is revolving about the axis of the shaft 25, and by means of the worm gearing 35 and 36' and the swinging yokes 34, the axes of rotation of the articles of glassware may be varied to adapt the same to the finish applying devices hereinafter described.

The tumblers 47, or other articles of glassware or of ceramic composition, to the outer surfaces of which decorative patterns in multi-color effects are applied by the apparatus here disclosed, are inserted on the holders 45 at the loading position, indicated at A in Fig. 1, this taking place while the head 30 is stationary. From the loading position, the head rotates in the direction indicated by the arrow B to the first printing position, indicated at C, where the head rests for a predetermined interval, this intermittent motion being the function of the gearing 4 and 5. While the tumblers occupy the printing position C and are being continuously rotated by power derived from the radial shafts 41, an oil impression of a decorative pattern is applied to the outer surfaces of the article 47. This is accomplished by means of a frame 62 which is supported in connection with the stationary table 16.

As shown in Figs. 7 to 10 inclusive, the frame 62 includes upstanding, transversely spaced sides 63—63. Between these sides there is supported an axle 64 for the rotary support of a primary oil feeding roll 65, the latter having a somewhat tapered periphery. Also supported for rotation by the sides 63 are intermediate oil-transferring rolls 66 carried by shafts 67, and contacting with the peripheral portions of the rolls 66 are secondary oil transferring rolls 68, which are supported for rotation about shafts 69 carried transversely by the frame sides 63. The ends of the shafts 69 project through and beyond the sides 63 and carry the lower ends of freely swinging links 70, the upper ends of said links furnishing support for the shafts 71 of a pair of tertiary oil transferring rolls 72. The peripheral portions of the rolls 72 are maintained in continuous contact with a pair of impression applying rolls 73, the latter having their supporting shafts 74 journaled in connection with a pair of vertically movable standards 75. These standards are mounted for sliding movement within guides 76 so that upon vertical movement of the standards, the impression applying rolls 73 may be moved into and out of engagement with the articles of glassware or the like 47, whose outer surfaces are pressed into contact with the impression producing peripheries of the rolls 73 when such articles occupy the position C.

An impression or base providing oil, for instance, a viscous linseed oil or varnish or an oil of analogous properties is applied to the periphery of the roll 65 and is transferred to and uniformly spread over the peripheral portions of the plain surfaced conical rolls 66, 68 and 72, so that the oil will be uniformly transferred in required quantities to the resilient pattern producing covering 77 of the rolls 73.

This covering may take the form of a sheet, band or body of rubber or other resilient composition upon which has been etched, cut or otherwise produced in bas-relief or intaglio a desired decorative design to be applied to the glassware. This design may be anything capable of being drawn or photographed. Inasmuch as the covering of the roll 73 contacts with the outer surfaces of the articles 47 while both are being rotated, an oil deposit conforming with the configuration of the decorative pattern on the covering 77 will be imparted to the outer surfaces of the articles of glassware occupying position C. This oil base impression is then used in subsequent operations of the machine, hereinafter described, for applying a fusible colored ceramic coating to the articles of glassware, which coating will adhere only to the oil containing surfaces of the glassware, as formed by the impression rolls, but will not adhere to the clean or non-oiled surfaces thereof.

The rotation of the impression rolls 73 and the movement of said rolls toward and away from the tumblers or other articles 47 is effected by means of the drive shaft 78, shown in Fig. 8. This shaft, driven as hereinafter described, carries at the outer end thereof a sprocket 79, around which is trained the lower run of an endless chain 80. The upper run of this chain is trained over a sprocket 81 fixed on the outer end of a transverse shaft 82 which is supported for rotation in connection with the sides 63 of the frame 72. Also fixed on the shaft 82 is a second sprocket 83, around which is trained the lower run of an endless impression roll driving chain 84. The chain 84 has its side runs trained over sprockets 85—85 supported by the outer ends of the shafts 74, and the upper run of the chain 84 passes over a guide sprocket 86 loosely rotatable on a stud shaft 87 carried by the upper end of one of the frame sides 63.

By this driving arrangement, the rotation of the rolls 73 is continuously accomplished in all positions of vertical adjustment of said impression rolls, that is, when the rolls 73 are both in or out of engagement with the articles of glassware. The links 70, which support the tertiary oil transferring rolls 72, have connected with their upper ends coil springs 88 which tend to maintain the rolls 68, 72 and 73 in constant contact in all positions of adjustment of the standards 75 and the mechanism carried thereby.

The raising and lowering of the standards 75 to bring the rolls 73 into and out of engagement with the articles of glassware, rotatably carried by the intermittently revolving head 30, is effected by the provision of a sleeve 89 which is rotatably mounted in the frame 62 in concentric relationship with the shaft 78. Fixed to one end of the sleeve 89 is a sprocket 90, driven as hereinafter described, by which the timed rotation of the sleeve 89 is effected. Fixed to the opposite ends of the sleeve 89 is a pair of internal cams 91—91 and engaging with the peripheries of these cams are rollers 92 which are carried by studs 93 projecting horizontally from the lower ends of the standards 75. These cams are so designed that when the head 30 is revolved to position articles of glassware or the like momentarily in the position C, the cams will be positioned to permit of the elevation of the standards 75 and the engagement of the rolls 73 with the articles of glassware under the action of the coil springs 88. After the desired application of oil to the outer surfaces of the glassware, the cams 91 operate to lower the standards 75 and remove the rolls 73 from contact with the articles of glassware, at which time, the head 30 revolves to a sufficient extent to transfer the articles of glassware to which the oiled designs have been applied to the position indicated at D where a colored fusible decorative material is applied to the articles of glassware, the position D being referred to as the dusting position.

In order to drive the oil applying or printing mechanism and other cooperative apparatus, including the shafts 43 for the article holders, power is imparted from the gear 20 to the outer sleeve member 22. Keyed to the upper end of this sleeve member is a beveled gear 94, the teeth of which mesh with a plurality of pinions 95 fixed on the inner ends of the radially disposed shafts 41, the latter being journaled for rotation in bearings 96 and 97 which are fixed to and depend from the head 30. By this means, the article holding and rotating shafts 43 are continuously driven as long as power is imparted to the shaft 18 and throughout all positions of rotative adjustment of the head 30.

To drive the printing mechanism rolls, one of the shafts 41 is provided with a spur gear 98, which meshes with a corresponding spur gear 99 fixed on a shaft 100, rotatably supported by one set of bearings 96 and 97. At the inner end of the shaft 100, there is arranged a beveled gear 101, which meshes with a gear 102 loosely rotatable about the sleeve member 22. The gear 102 is provided with upper and lower rows of teeth, the upper row of which meshes with the teeth of the pinion 101, while the lower row of teeth mesh with a plurality of beveled pinions 103, the latter being fixed upon the inner ends of a plurality of radially extending shafts 104, which are journaled in bearings 105 and 106 mounted on the upper surface of the table 16.

The shafts 104 which extend to the printing or impression producing mechanisms carry at their outer ends sprockets 107 and 108. Around the sprocket 107, there is trained a chain 109 which leads to the sprocket 90 of the sleeve 89, while the sprocket 108 has trained thereabout a chain 110 which leads to a sprocket 111 fixed to the shaft 78. By this mechanism, the rolls 73 may be positively driven in a continuous manner and the rolls 72, 68, 66 and 65 continuously driven by frictional engagement with one another.

The mechanism for applying the fusible colored ceramic dust to the oiled impression surfaces of the articles undergoing decoration, consists of a receiver 112 for said fusible material, as shown in Fig. 14. The bottom of this receiver is covered by a mat 113, and the receiver is mounted so that it may be reciprocated vertically into and out of engagement with the outer surfaces of the articles 47 occupying the dusting position or positions D.

To effect this result, the receiver 112 of each dusting mechanism is carried by an upright standard 114. Connected with each receiver is a bracket 115, the base portion of which is slotted as at 116 for the reception of clamping bolts 117 which said brackets and the receivers carried thereby are secured for vertical adjustment in connection with the upper end of the standard 114.

The lower portion of the standard is slidably received within a vertical guideway 118 formed in connection with the bracket 119 arising vertically from the table 16. The extreme lower end of the standard 114 is equipped with a stud axle 120 which carries a roller 121. This roller engages with the face of an internal cam 122, the latter being fixed on a rotatable shaft 123 rotatably supported in connection with the brackets 106 and 119. The shaft 123 is rotated by providing the shaft 104 extending to the dusting mechanism at its outer end with a sprocket 124, around which passes an endless chain 125 which leads to a sprocket 126 fixed on the shaft 123. A coil spring 127 has its upper end fastened to a stationary web 128 and its lower end fastened to a pin 129 projecting from the standard 114. Since the shaft 104 is driven as previously described, rotation will be imparted to the shaft 123 and timed rotation to the cam 122. This cam is so shaped and set that when the head 30 comes to rest in the position D, the standard 114 will be lowered against the tension exercised thereon by the spring 127, bringing the mat 113 into contact with the rotating articles of glassware 47 to which a desired oil impression of a given design has been imparted by the printing mechanism arranged in the position C. This oil impression permits of the adherence of the pulverulent and fusible ceramic material, indicated at 130, on the oil containing surfaces only of the articles 47 since any such material which may deposit on the clean or unoiled surfaces of said articles will not adhere to the latter.

Following desired engagement of the mat 113 with the articles 47, the cam 122 assumes a position providing for the automatic elevation of the standard 114 and the receiver 112 under the influence of the spring 127, and the head 30 is then revolved by the Geneva gearing from the dusting position D to the cleaning position indicated at E. The mechanism provided at position E is virtually a duplicate of the dusting mechanism shown in Figs. 12 to 15 inclusive, with the exception that the receiver or holder 131, which corresponds to the receiver or holder 112, contains a body of soft fabric which will remove surplus fusible material from the outer surfaces of the articles 47, so that the fusible material will be present in required amounts and on the oiled surfaces only of the glassware.

If but a single color is to be applied to the articles of glassware or the like, the said articles may be removed from the machine following the cleaning operation at the position E, and placed in a leer so that the fusible material may be permanently bonded to the glass or ceramic composition of the article undergoing decoration. Often it is desirable to produce on such articles a multiplicity of colors, or to blend one color with another. In the machine illustrated in the accompanying drawings, four separate printing, dusting and cleaning stations and mechanisms have been disclosed, permitting four different colors to be imparted to the articles undergoing decorations or various blends or shades of a given color or colors.

For instance, at the station D, a blue color may be imparted to the pattern on the glassware. At the station D1, the color red may be applied, at the station D2, the color yellow, and at the station D3, the color white. Also, one color may be applied directly to another previously applied color to procure various shades or tone gradations. As previously explained, any desired design may be applied which is capable of being formed on a mat or covering 77 of the roll 73. When the head has been rotated to the position F, known as the take-off station, the valve 61 may be automatically closed by the action of the cam 60 so that the operator may quickly remove a pair of decorated glasses from the supporting holders 45 and place the glasses or other articles on a traveling belt (not shown) leading to the fusing leer or furnace.

While the present invention has been shown as adapted for the applying of decorative effects to the external surfaces of table glasses, it will be well understood that the invention is applicable to all types of articles of a glass or ceramic nature or other articles having a surface formation admitting of the application of the oil and the powdered fusible ceramic materials. Modifications may be made in the configuration of the rolls 73 to conform with the shape of the article receiving the decoration. The apparatus here disclosed has a high production capacity, may be operated by relatively inexperienced operators and produces clear and distinct decorative patterns of unusually high quality and esthetic appeal and sharp definition.

What is claimed is:

1. In apparatus for applying colored designs to glassware, a base, a work supporting head, drive means for effecting intermittent rotation of said head about a substantially vertical axis, an article holder carried by said head, means for rotating said holder about an axis disposed in angular relation to said vertical axis, an impression applying roll supported by said base and arranged for engagement with an article of glassware supported on said holder, means for rotating said impression roll, means mounted on said base in spaced relation from said roll and engageable with the article of glassware following the engagement of the latter with said roll to apply a pulverulent colored ceramic coating material to the surfaces of said article upon which an oil base impression of a given design has been imparted by said roll, means arranged on said base and engageable with the article of glassware following deposit of the ceramic coating material thereon to remove excess quantities of coating material from the surface of said article, and means for moving the impression roll, the coating material applying means and the surplus material removing means into and out of engagement with the article of glassware supported on said holder when said head is held stationary between intermittent periods of rotation thereof.

2. In apparatus for producing colored designs on surfaces of a glass-like nature, a work holder intermittently rotatable about a vertical axis and continuously rotatable about its longitudinal axis, means for imparting to a glass-like surface of an article carried by said holder a film of viscous material of a desired decorative pattern, means for applying to the film thus deposited on said surface a fusible color-containing pulverulent material which adheres to the film containing portions only of the article surface, and means for removing excess quantities of the fusible material from said article surface, said holder being restrained against rotation about its vertical axis when the article supported thereby is successively engaged by the film applying means, the means for applying the fusible color-containing material and the means for removing excess material.

3. Apparatus for applying colored designs to glassware and the like comprising a base, vertically arranged inner and outer sleeves rotatably supported by said base, a drive shaft, gearing driven by said drive shaft for imparting intermittent rotation to said inner sleeve, means driven by said drive shaft for imparting intering said outer sleeve, a work supporting head intermittently rotatable with said inner sleeve, a plurality of article supporting holders carried by said head, means driven by the rotation of said outer sleeve for imparting continuous rotation to said holders about their longitudinal axes, means carried by said base and engageable with articles mounted on said holders for applying to the surfaces of such articles a viscous film of desired pattern, means carried by said base and engageable with articles containing said viscous film to apply thereto a pulverulent color-containing coating material, and means for removing excess coating material from the surfaces of said articles.

4. In apparatus for applying colored designs to glassware, a frame, a roll revolubly supported in said frame, said roll containing a design pattern of a compressible material, means carried by said frame for effecting continuous rotation of said roll, timed means for moving said roll between active and inactive positions, and means for rotatably supporting an article of glassware in engagement with said roll when the latter occupies its active position.

5. In apparatus for applying colored designs to glassware, a frame, a roll revolubly supported in said frame, said roll containing a design pattern of a compressible material, means carried by said frame for effecting continuous rotation of said roll, timed means for moving said roll between active and inactive positions, means for rotatably supporting an article of glassware in engagement with said roll when the latter occupies its active position, and a plurality of supplemental rolls carried by said frame and continuously cooperative with said design roll to impart to the surfaces of the latter a transferable film of oleaginous composition.

6. In apparatus for applying colored designs to articles of glassware and the like, a receptacle adapted for the reception of a pulverulent color-containing fusible coating material, said receptacle having an outlet, a mat covering said outlet, a vertically movable support for said receptacle, a rotatable holder for the reception of an article of glassware, and means for effecting relative engagement between an article of glassware mounted on said holder and the matted region of said receptacle.

7. In apparatus for decorating glassware and the like, a receptacle adapted for the reception of a powdered fusible ceramic coloring material, said receptacle having an outlet, a mat covering said outlet, a support for said receptacle, a guide frame for said support in which the latter is slidably mounted, spring means normally maintaining said support in an elevated position, an article holder movable into and out of registration with the matted outlet of said receptacle, and means for moving said support and said receptacle bodily when said holder and an article carried thereby occupies a position of registration with said receptacle, whereby to effect engagement between the mat of said receptacle and the outer surfaces of said article to produce a deposit of the powdered coating material on the surfaces of said article.

8. In apparatus for applying colored decorative designs to articles of glassware and the like, a base, an intermittently rotatable head supported for rotation about a substantially vertical axis arising from said base, a plurality of circumferentially spaced ware-supporting holders carried by said head, means for rotating said holders and the ware supported thereby about the longitudinal axes of the ware, a plurality of circumferentially spaced pattern applying rolls carried by said base, said rolls being engageable with the ware supported by said holders to apply to the surfaces of such ware oleaginous films possessing the patterns of said rolls, a plurality of circumferentially spaced units mounted on said base for supplying to the film containing surfaces of the ware supported by said holders a pulverulent coating of a fusible color-containing material, and a plurality of circumferentially spaced devices cooperative with the ware carried by said holders for removing excess coating material from said ware.

9. Apparatus for automatically applying permanent colored coatings in desired patterns to articles of glass or ceramic ware comprising a support, a pair of concentric shafts revolubly carried by said support, means imparting intermittent rotation to one of said shafts and continuous rotation to the other, a table revolubly mounted on said support and directly connected with said intermittently rotatable shaft, a plurality of article holders carried by said table, motion transmitting mechanism connecting said article holders with said continuously rotatable shaft to continuously rotate articles disposed on said article holders, a plurality of resilient impression applying rollers carried by said support at spaced points of rest of the article holders carried by the table, means for supplying an oil film to said impression applying rollers, means carried by said support at the points of rest following those occupied by the impression rollers for applying a fusible pulverulent ceramic coloring material to articles held by said article holders, means carried by said support at the points of rest following those occupied by the color applying means for removing excess coloring material from the articles, said impression applying means, color applying means and excess color removing means being movable toward and away from articles held on said article holders, and motion transmitting mechanism driven by said continuously rotatable shaft for moving said impressing means, said color applying means and said excess color removing means.

10. Apparatus for automatically applying permanent colored coatings of desired patterns to articles of glass or ceramic ware comprising a support, a table rotatably mounted on said support, means for imparting intermittent rotary movement to said table, article holders provided at circumferentially spaced points on said table, a plurality of rotatable impression applying rolls carried by said support at spaced points of rest of the article holders provided on said table, means for holding pulverulent ceramic coloring material disposed on said support at the points of rest following those occupied by said impressing means, article cleaning means provided on said support at the points of rest following those occupied by said color holding means, said impressing rolls, color holding means and cleaning means being movable into and out of engagement with articles positioned on said article holders, and synchronized means for revolving said article holders and impressing rolls and for moving said impressing means, said color holding means and said cleaning means.

11. In a machine for applying colored designs to articles of glassware and the like, a pattern roll of compressible composition, a frame on which said roll is revolubly mounted, a plurality of oil-transferring rolls mounted in said frame, said rolls having their peripheral surfaces arranged in frictional driving relationship with each other and with said pattern roll and operating to impart to the periphery of said pattern roll a viscous oily deposit, a rotatable article support, and means for automatically moving said pattern roll supporting frame toward and away from said article support to cause the engagement of the pattern roll with an article carried by the support.

12. In a machine for applying colored designs to articles of glassware and the like, a pattern roll of compressible material, a frame on which said roll is revolubly mounted, means provided in connection with said frame operative to impart to the periphery of said pattern roll a viscous oily deposit, a support for said frame, the latter being movably mounted on the former, and means for simultaneously rotating said pattern roll and moving said frame relative to said support.

13. In a machine for applying colored designs to articles of glassware and the like, a roll provided with a decorative pattern in relief, a frame on which said roll is revolubly mounted, means provided adjacent to said roll and operative to impart to the pattern thereon a viscous oily deposit, a support on which said frame is movably mounted, means for continuously rotating said pattern roll, and means for intermittently moving said frame relative to said support.

14. In a machine for applying colored designs to articles of glassware and the like, a support, a frame movably mounted on said support, a receptacle provided on said frame for the reception of a pulverulent color-containing fusible coating material, said receptacle having an outlet, a flexible mat covering said outlet, and means for intermittently moving said frame on said support to position said mat in engagement with an article positioned in said machine.

15. Apparatus for automatically applying permanent colored coatings in desired patterns to articles of glass or ceramic ware comprising means for applying an oil film in the form of a pattern to the surface of the ware to be decorated, means for applying to the oil coated areas of said surface a fusible color-containing coating material, means for removing surplus quantities of the coating material from the surface of said ware, and means for positively rotating said ware and moving it successively from the film applying means to the color applying means and surplus coating removing means.

16. In a machine for applying colored designs to articles of glassware and the like, a base, a pair of concentric shafts rotatably supported by said base, means for imparting intermittent rotation to one of said shafts and continuous rotation to the other, a table secured to the intermittently rotating shaft for movement therewith, a plurality of circumferentially spaced ware holders extending radially from said table, said holders being supported for rotation about the axes of articles of ware carried thereby, circumferentially spaced frame members mounted on said base adjacent to the periphery of said table, a carrier movably supported in connection with each of said frames, a resilient impression applying roll journaled in connection with the first of said carriers for rotary movement about an axis substantially parallel to the axis of rotation of a ware holder positioned adjacent thereto during the periods of rest of said table, a container for comminuted fusible ceramic coloring material mounted on the second of said carriers, a color applying mat formed with said container, a fabric ware-cleaning element supported by one of said carriers, and synchronized motion transmitting mechanism for simultaneously rotating said ware holders and impression roll and moving said carriers relative to said frame members to position the impression roll, the color applying mat and ware cleaning element in engagement with ware mounted on said holders.

17. In a machine for applying colored designs to substantially cylindrical articles of glassware, a base, a table revolubly mounted on said base, a plurality of ware holders extending radially from said table and journaled for rotation about substantially horizontal axes, driving means on said base for imparting intermittent rotation to said table and continuous rotation to the ware holders, a frame carried by said base at the periphery of said table, a carrier movably supported by said frame, a shaft journaled in said frame with the axis of rotation substantially parallel to that of a ware holder when the table is at a point of rest, a resilient pattern applying roll mounted on said shaft, motion transmitting means extending from said driving means to said carrier and shaft to rotate the latter and move said carried on said frame to positions adjacent to and remote from a ware holder on said table when at a point of rest, and means for yieldably holding said pattern applying roll in engagement with an article of ware when said carrier is in a position adjacent to a ware holder.

18. In a machine for applying colored patterns to cylindrical glass articles, a ware support, pattern impressing means comprising a resilient design bearing roll journaled for rotation about an axis parallel with the longitudinal axis of an article held on said ware support, cooperating means for applying a viscous film to said roll, carrier means for said roll, means for applying a comminuted fusible ceramic coloring material to an article operated upon by said impressing means, said color applying means including a receptacle for the coloring material, a fabric mat to transfer said coloring material to the impressed ware, a carrier for said mat, and synchronized power driven means for moving the ware support from the pattern impressing means to the color applying means, revolving the ware support and design bearing roll about the longitudinal axes thereof and moving the carriers toward and away from the ware when in registration therewith to cause the prolonged engagement of the design bearing roll and color applying mat with the articles of ware during rotation thereof.

19. In a machine for applying colored patterns to articles of glassware and the like of the type having an intermittently movable table, ware holders revolubly supported thereby and driving means for moving said table and revolving said ware holders, mechanism for producing an oil-like design film on articles supported by said ware holders comprising a frame, a carrier movably mounted on said frame, a resilient design bearing roll journaled for rotation in said carrier, a cooperative roll conforming in size to said design bearing roll for supplying a film of oil thereto, means for supplying oil in regulated quantities to said cooperative roll, power operated means for moving said carrier toward and away from the ware holders, and resilient means for holding said design bearing roll in yieldable engagement with an article of ware on one of said holders.

20. In a machine for applying colored designs to articles of glassware, a base, a table mounted on said base, bracket means provided in connection with said table, a yoke frame pivotally supported in connection with said bracket means, a ware holder rotatably carried by said yoke frame, power operated means for imparting rotary movement to said ware holder, a design bearing roll journaled for rotation about a horizontal axis adjacent to the edge of said table, and motion transmitting mechanism connecting said roll and said power operated means, the movement of said yoke frame on its pivot operating to vary the angularity of the axis of rotation of said ware holder with respect to that of said design bearing roll.

21. In a machine for applying colored designs to articles of glassware, a base, a ware holder rotatably supported in connection with said base, a design bearing roll revolubly supported adjacent said ware holder, synchronized driving means for imparting rotary movement at similar rates to said ware holder and said design bearing roll, and resilient means for yieldably holding said roll in engagement with an article of ware positioned on said holder.

22. In a glassware decorating machine of the type having a plurality of spaced rotatable ware holders, a base, a support on said base for said ware holders, means for applying a viscous film of an ornamental design to articles of glassware carried by said ware holders and power driven means for continuously rotating said ware holders and intermittently moving the support to cause consecutive registration of said holders with said film applying means, means for applying a powdered fusible ceramic coloring material to the film on the articles comprising a frame mounted on said base in spaced relation to said film applying means, a container mounted on said frame for the reception of the coloring material, a fabric powder applying element cooperating with said container to receive the coloring material therefrom, the articles of glassware being moved into registration with said color material applying means after receiving the design film, and means operated by said power driven means for moving said fabric element into engagement with the articles on said holders and yieldably maintaining the engagement during rotative movement of said articles.

23. In a glassware decorating machine of the type having a plurality of spaced rotatable ware holders, a base, a support on said base for said ware holders, means for applying a viscous film of an ornamental design to articles of glassware carried by said ware holders and power driven means for continuously rotating said ware holders and intermittently moving the support to cause consecutive registration of said holders with said film applying means, means for applying a powdered fusible ceramic coloring material to the film on the articles comprising a holder for the coloring material, a powder applying element disposed adjacent said holder and receiving coloring material therefrom, and timed means for moving said applying element into engagement with the articles on said holders and yieldably maintaining the engagement during rotative movement of said articles.

24. In a machine for applying colored designs to articles of glassware, a base, a table mounted on said base, bracket means provided in connection with said table, a yoke frame pivotally supported in connection with said bracket means, a ware holder rotatably carried by said yoke frame, power operated means for imparting rotary movement to said ware holder, a design bearing roll journaled for rotation about a horizontal axis adjacent to the edge of said table, motion transmitting mechanism connecting said roll and said power operated means, and means for adjusting said yoke frame to vary the position of said ware holder with respect to the design bearing roll.

25. Apparatus for automatically applying permanent colored coatings in desired patterns to articles of glass and ceramic ware comprising a support, a plurality of continuously rotated article holders carried by said support, power means for moving said article holders to spaced points of rest, a resilient impression applying roll carried by said support at a point of rest of the article holders, means for supplying an oil film to said impression applying roll, means carried by said support at points of rest of the article holder following that occupied by the impression roller for applying a fusible pulverulent coloring material to articles held by said article holders, means carried by said support at points of rest following those occupied by the color applying means for removing excess coloring material from the articles, said impression applying roll, color applying means and excess color removing means being movable toward and away from articles held on said article holders, and motion transmitting mechanism driven by said power means for moving said impressing roll, said color applying means and said excess color removing means in timed relation to the movement of said article holders between points of rest.

26. In a machine for applying colored designs to articles of glassware and the like, a support, a frame movably mounted on said support, a receptacle provided on said frame for the reception of a pulverulent color-containing fusible coating material, a yieldable color applying member carried by said frame and receiving pulverulent material from said container, and means for intermittently moving said frame on said support to position said applying member in engagement with an article positioned in said machine.

27. In a glassware decorating machine of the type having a plurality of spaced rotatable ware holders, a base, a support on said base for said ware holders, means for applying a viscous film of an ornamental design to articles of glassware carried by said ware holders and intermittently moving the support to cause consecutive registration of said holders with said film applying means, means for applying a powdered fusible ceramic coloring material to the film on the articles comprising a holder for the coloring material, a powder applying element disposed adjacent said holder and receiving coloring material therefrom, timed means for moving said applying element into engagement with the articles on said holders and yieldably maintaining the engagement during rotative movement of said articles, and means for varying the angularity of the longitudinal axis of the articles on said holders with respect to the surface of the powder applying elements engaged thereby.

28. In apparatus for applying colored designs to glassware, a frame, a continuously rotatable horizontally disposed article holder mounted on said frame, means on said frame for intermittently moving said article holder between spaced stations, pattern bearing impression means mounted adjacent one station, power operated means for moving said impression means into and out of engagement with an article disposed on a holder while at the station, means disposed at the following station for applying a quantity of powdered color containing fusible material to the impression produced on the article at the preceding station, and means for moving said color applying means vertically into contact with the article while at the coloring station.

THOMAS S. BAUMAN.